Patented June 16, 1931

1,810,846

UNITED STATES PATENT OFFICE

FRITZ MÜLLER, OF BASEL, SWITZERLAND, ASSIGNOR TO CHEMICAL WORKS FORMERLY SANDOZ, OF BASEL, SWITZERLAND

PROCESS OF MAKING DIALKYL BARBITURIC ACIDS AND 1-PHENYL- 2,3 DIMETHYL-4-DIMETHYLAMINO-5-PYRAZOLONE

No Drawing. Application filed November 20, 1928, Serial No. 320,763, and in Switzerland December 3, 1927.

The compounds of 5,5-disubstituted barbituric acids and 1-phenyl-2,3-dimethyl-4-dialkylamino-5-pyrazolones are often used as analgetics and soporifics. These salt-like compounds are usually prepared by melting equimolecular quantities of the components or by dissolving them in solvents and evaporating the same. The products thus obtained, especially when prepared by melting, are always more or less of a yellowish color, which color is probably due to a partial oxidation of the pyrazolone derivative.

It has now been found that the compounds of 5,5-disubstituted barbituric acids and 1-phenyl-2,3-dimethyl-4-dialkylamino-5-pyrazolones can be obtained in a very pure state and often in a colorless or only slightly yellowish crystalline form, if salts of 5,5-disubstituted barbituric acids and salts of 1-phenyl-2,3-dimethyl-4-dialkylamino-5-pyrazolones are allowed to interact in a saturated aqueous solution of the 1-phenyl-2,3-dimethyl-4-dialkylamino-5-pyrazolene itself in the reaction.

If, for instance, the reaction is carried out in pure water and 1-phenyl-2,3-dimethyl-4-dimethylamino-5-pyrazolone is employed, a product is obtained, which does not contain the molecular quantity of the pyrazolone component, owing to the fact that the compound is partially hydrolyzed and the more easily soluble pyrazolone derivative partly dissolved in water. This dissolution does not take place if a saturated aqueous solution of the pyrazolone derivative is used as a solvent.

The products thus obtained are purer even without a subsequent recrystallization, than those prepared according to the processes known at present. They are colorless crystalline compounds, which are difficultly soluble in water, soluble in alcohol and methanol and possess analgetic and soporific properties.

For carrying out this process it is not absolutely necessary to start from the isolated salts of 5,5-disubstituted barbituric acid, the reaction may also be performed with a solution which has been prepared by adding the calculated quantity of an alkali, for instance caustic soda, to a suspension of a barbituric acid in a saturated aqueous solution of 1-phenyl-2,3-dimethyl-4-dialkylamino-5-pyrazolone.

The following examples illustrate the invention, the parts being by weight:

1. 224 parts of isobutylallylbarbituric acid are suspended in 1500 parts of a saturated aqueous solution of 1-phenyl-2,3-dimethyl-4-dimethylamino-5-pyrazolone and brought into solution by addition of 40 parts of sodium hydroxide. The solution thus obtained is slowly added, under stirring, to a solution of 231 parts of 1-phenyl-2,3-dimethyl-4-dimethylamino-5-pyrazolone in 1000 parts of normal hydrochloric acid, which solution is subsequently saturated with 1-phenyl-2,3-dimethyl-4-dimethylamino-5-pyrazolone.

The salt-like compound immediately separates out in slightly yellowish drops which soon solidify to nearly colorless crystal needles. Its fusion point is 87—89° C. under previous sintering. The other properties are the same as described in the U. S. specification No. 1,655,795.

2. 206 parts of the sodium salt of diethylbarbituric acid are dissolved in 2000 parts of a saturated aqueous solution of 1-phenyl-2,3-dimethyl-4-dimethylamino-5-pyrazolone and added as indicated in Example 1 to a solution of 231 parts of 1-phenyl-2,3-dimethyl-4-dimethylamino-5-pyrazolone in 1000 parts of normal hydrochloric acid (this solution is previously saturated with the same pyrazolone derivative). The reaction product separates out in form of a colorless crystalline powder; it possesses after suction and drying the F. P. 115—117° C. (Literature indicates 111° C.).

3. 232 parts of the sodium salt of isopropylallylbarbituric acid are dissolved in 2000 parts of a saturated aqueous solution of 1-phenyl-2,3-dimethyl-4-dimethylamino-5-pyrazolone and the solution is dropped under stirring into a solution of 231 parts or 1-phenyl-2,3-dimethyl-4-dimethylamino-5-pyrazolone previously saturated with this compound. The reaction product separates out as a colorless oil which solidifies to crystal needles. F. P. 97° C.

4. 254 parts of the sodium salt of phenylethylbarbituric acid are brought into interaction with a solution of 231 parts of 1-phenyl-2,3-dimethyl-4-dimethylamino-5-pyrazolone, prepared according to the preceding examples. The oily separating products soon solidify to nearly colorless crystals of F. P. 132—134° C.

5. 246 parts of the sodium salt of n-butylallybarbituric acid are dissolved in 2000 parts of a saturated aqueous solution of 1-phenyl-2,3-dimethyl-4-dimethylamino-5-pyrazolone and allowed to interact with 231 parts of 1-phenyl-2,3-dimethyl-4-dimethylamino-5-pyrazolone dissolved in 1000 parts of normal sulphuric acid (the solution is before its use saturated with the same pyrazolone derivative). The compound soon separates out in form of colorless, fine crystals. F. P. 91° C.

6. 224 parts of isobutylallylbarbituric acid are suspended in 2500 parts of a saturated aqueous solution of 1-phenyl-2,3-dimethyl-4-diallylamino-5-pyrazolone and brought into solution by adding 40 parts of sodium hydroxide. This solution is poured while stirring into a solution of 285 parts of 1-phenyl-2,3-dimethyl-4-diallylamino-5-pyrazolone in 2000 parts of a half normal hydrochloric acid, which solution is previously saturated with the pyrazolone compound. The new compound soon separates out in nearly colorless drops, which solidify to white very fine crystal needles. The compoud melts after drying at 70—71° C.

7. 224 parts of isobutylbarbituric acid and 259 parts of 1-phenyl-2,3-dimethyl-4-diethylamino-5-pyrazolone are allowed to interact in the manner as indicated in the preceding examples. The new compound first separates out in a pasty mass which solidifies to a white microcrystalline powder. F. P. 70—72° C.

What I claim is:

1. A process for the preparation of compounds of 5,5-disubstituted barbituric acids and 1-phenyl-2,3-dimethyl-4-dialkylamino-5-pyrazolones, consisting in the interaction of alkali metal salts of 5,5-disubstituted barbituric acids and strong mineral acid salts of 1-phenyl-2,3-dimethyl-4-dialkylamino-5-pyrazolones, the latter being used in form of a saturated aqueous solution forming solvent for the double decomposition.

2. A process for the preparation of compounds of 5,5-disubstituted barbituric acids and 1-phenyl-2,3-dimethyl-4-dimethylamino-5-pyrazolone, consisting in the interaction of alkali metal salts of 5,5-disubstituted barbituric acids and strong mineral acids salts of 1-phenyl-2,3-dimethyl-4-dimethylamino-5-pyrazolone, the latter being used in form of a saturated aqueous solution forming solvent.

3. As a new article of manufacture the new compound of isobutylallylbarbituric acid and 1-phenyl-2,3-dimethyl-4-dimethylamino-5-pyrazolone obtained by the interaction of an alkali metal salt of the former and a strong mineral acid salt of the latter in form of a saturated aqueous solution, said compound constituting a colorless crystalline product, difficultly soluble in water, soluble in alcohol and methanol, possessing analgetic and soporific properties and having its melting point at 70—71° C.

In witness whereof I have hereunto signed my name this 8th day of November, 1928.

FRITZ MÜLLER.